(No Model.)
P. SCHOFIELD.
FAUCET.
No. 334,291. Patented Jan. 12, 1886.
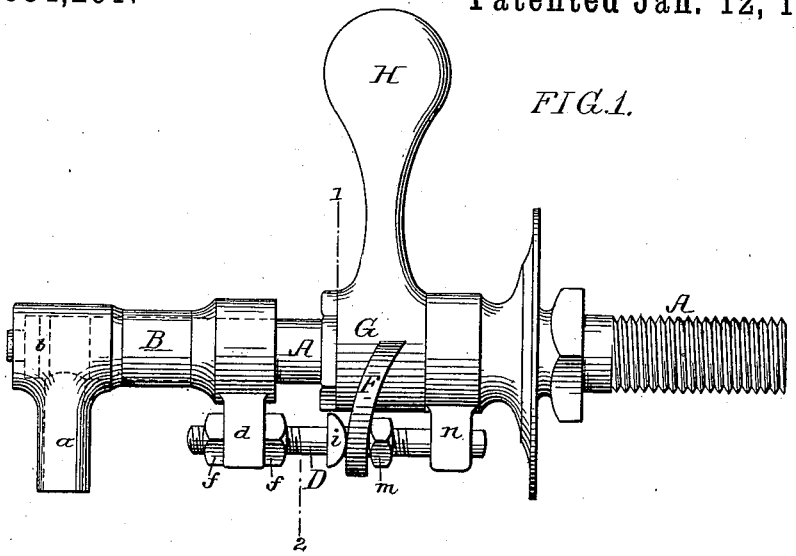
FIG. 1.
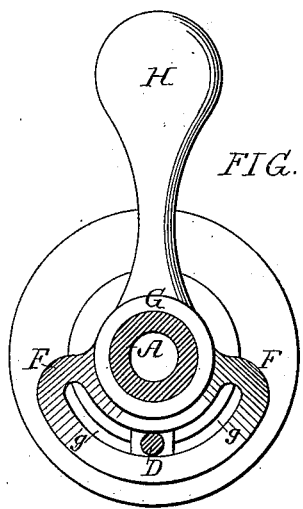
FIG. 2.
FIG. 3.
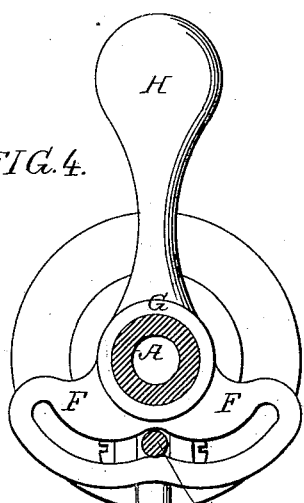
FIG. 4.
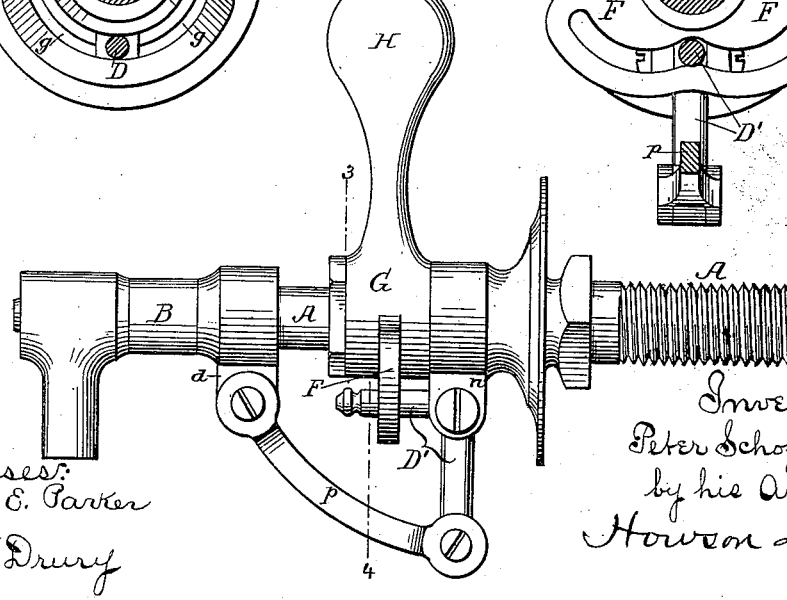
Witnesses:
John E. Parker
Harry Drury
Inventor:
Peter Schofield
by his Attorneys
Howson and Sons

UNITED STATES PATENT OFFICE.

PETER SCHOFIELD, OF POMONA, NEW JERSEY.

FAUCET.

SPECIFICATION forming part of Letters Patent No. 334,291, dated January 12, 1886.

Application filed September 7, 1885. Serial No. 176,356. (No model.)

*To all whom it may concern:*

Be it known that I, PETER SCHOFIELD, a citizen of the United States, residing in Pomona, Atlantic county, New Jersey, have invented certain Improvements in Faucets, of which the following is a specification.

My invention consists of certain improvements in the faucet for which I obtained Letters Patent of the United States, No. 320,705, dated June 23, 1885, the object of my present improvements being to simplify the mechanism for operating the sliding tube of the faucet.

In the accompanying drawings, Figure 1 is a side view of a faucet constructed in accordance with my present invention; Fig. 2, a transverse section of the same on the line 1 2, Fig. 1; Fig. 3, a side view of a modified form of faucet; and Fig. 4 a section on the line 3 4, Fig. 3.

A represents the tubular stem of the faucet, which is threaded at the inner end for adaptation to a barrel or other reservoir of liquid. Upon the outer end of this tubular stem is free to slide a tube, B, which has a discharge-branch, $a$, and carries at the front end an internal valve, $b$, which, when pressed against the end of the tubular stem A, cuts off the flow of liquid through the same, the liquid escaping from the stem and passing through the branch $a$ when the tube B has been projected, as shown in Fig. 1. On the under side of the tube B is a projecting lug, $d$, to which a rod, D, is adjustably secured by means of nuts $f f$, this rod passing through a segmental slot, $g$, in a double cam, F, secured to a hub, G, which is confined longitudinally to, but is free to turn on, the tubular stem A, this hub having a weighted handle, H. The rod D is confined longitudinally to the cam F by means of a flange or collar, $i$, bearing upon one side of said cam, and a nut, $m$, bearing on the other side of the same, the inner end of the rod D being guided in a stud, $n$, projecting from the stem A. The cam F is such that when the weighted handle H occupies the central position shown in Figs. 1 and 2 the tube B will be projected and the flow of liquid through the stem A and discharge-branch $a$ will not be interfered with; but on throwing the weighted handle to one side or the other one or other of the cams F will act upon the nut $m$ of the rod D and will move said rod and the tube B inward, so as to cause the valve $b$ to seat itself against the end of the stem A and cut off the flow through the latter, the tube being projected by the action of the cam on the flange or collar $i$ of the rod D on restoring the handle H to the central position. The valve can thus be operated from either the right or left hand, and will be held in the closed position by the weighted handle H, as in my patented valve before alluded to.

By manipulating the nuts $f$ the tube B can be adjusted in respect to the rod D so as to take up wear of the valve $b$, and wear of the cam F can be compensated for by adjusting the nut $m$.

In Figs. 3 and 4 I have shown a modification, in which the double cam F is in the form of a double eccentric slot adapted for the reception of a rod forming one arm of a bell-crank lever, D', hung to the stud $n$ on the stem A, the other arm of said lever being connected by a link, $p$, to the lug $d$ on the under side of the sliding tube B of the faucet. In this case, when the weighted handle H occupies the central position shown, the cam F has lifted the arm of the bell-crank lever D' so as to thrust the tube B outward, a movement of the handle in either direction causing the cam to depress the arm of the bell-crank lever subjected to its action, and thereby draw the tube B inward.

The cam F (shown in Figs. 1 and 2) need not necessarily be slotted, as the rod D may be beneath the cam, the lugs or projections on the rod embracing the edge of said cam.

I claim as my invention—

1. The combination of the tubular stem of the faucet, the sliding valve-carrier, the valve of which closes against the stem when the carrier is moved inward, a weighted handle having a hub provided with a double cam, F, and hung to the faucet-stem, so as to swing transversely to both sides of the same, and mechanism, substantially as described, whereby the sliding valve-carrier is projected by the cam when the handle is in the central position, but is retracted on throwing the handle to either side, all substantially as specified.

2. The combination of the stem A, the valve-carrier B, sliding thereon, the weighted handle having a double cam, F, and hung to the stem A, so as to swing transversely to both sides of the same, and the rod D, secured to the valve-carrier B and longitudinally confined to the cam F, as set forth.

3. The combination of the stem A and the valve-carrier B, sliding thereon, and having a rod, D, the weighted handle hung to the stem, so as to swing transversely to both sides of the same, and the double cam F, carried by the handle and slotted for the passage of the rod D, but longitudinally confined thereto, as specified.

4. The combination of the stem A, the sliding tube B, the weighted handle H, the double cam F, and the rod D, adjustably secured to the tube B and longitudinally confined to the cam, as specified.

5. The combination of the stem A, having a lug, n, the sliding tube B, the handle H, the double cam F, and the rod D, connected to the tube B, guided in the stud n, and having flanges or projections on opposite sides of the cam F, as specified.

In testimony whereof I have signed my name to this specification in the presence of two subscribing witnesses.

PETER SCHOFIELD.

Witnesses:
E. A. HAPPERSETT,
HENRY HOWSON.